United States Patent [19]

Michels et al.

[11] Patent Number: 5,171,385
[45] Date of Patent: Dec. 15, 1992

[54] HIGH ENERGY-DENSITY $N_2O_2$ COMPOUND

[75] Inventors: H. Harvey Michels, West Hartford; John J. Hinchen, Manchester, both of Conn.

[73] Assignee: United Technologies Corporation, Hartford, Conn.

[21] Appl. No.: 326,591

[22] Filed: Mar. 21, 1989

[51] Int. Cl.$^5$ .................. C06B 45/10; C06B 21/24
[52] U.S. Cl. .................. 149/19.1; 149/1; 149/74; 423/400; 423/405; 204/157.11; 204/157.44; 204/157.5
[58] Field of Search .............. 149/1, 191, 74; 423/400, 405; 204/157.41, 157.44, 157.5

[56] References Cited

U.S. PATENT DOCUMENTS

| | | | |
|---|---|---|---|
| 4,167,463 | 9/1979 | Conrad | 204/157.41 |
| 4,199,419 | 4/1980 | Holroyd et al. | 204/157.5 |
| 4,252,623 | 2/1981 | Vaseen | 204/157.41 |
| 4,536,252 | 8/1985 | McDonald et al. | 204/157.41 |
| 4,755,269 | 7/1988 | Brumer et al. | 204/157.41 |

*Primary Examiner*—Edward A. Miller
*Attorney, Agent, or Firm*—Charles E. Sohl

[57] ABSTRACT

An energetic compound having the structural formula

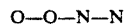

is disclosed. Routes for synthesizing the compound involving the reaction of oxygen atoms in the [$^1$D] electronic state with $N_2O$ are also disclosed. The energetic compound is particularly useful as an oxidant in chemical propulsion systems.

14 Claims, 6 Drawing Sheets

HIGH ENERGY-DENSITY $N_2O_2$ COMPOUND

The Government has the rights in this invention pursuant to Contract No. F04611-86-C-0071 awarded by the Department of the Air Force.

TECHNICAL FIELD

This invention pertains to energetic chemical compounds and to the use of such compounds as components of a chemical propulsion system.

BACKGROUND ART

Chemical propulsion systems use the energy of combination of a fuel and an oxidant to heat an expanding gas. Current liquid propellant technology yields a maximum specific impulse of 410s propellant using $H_2$ as a fuel and $O_2$ as an oxidant. Current solid propellant technology yields a maximum specific impulse of about 265s propellant for a typical solid propellant formulation using aluminum as a fuel and ammonium perchlorate as an oxidant.

An approach to increasing the performance of chemical propulsion systems is to replace the conventional oxidant with a higher energy compound. Despite extensive research, progress in the synthesis of new high energy oxidants has been slow.

DISCLOSURE OF INVENTION

An energetic compound having the structural formula: O—O—N—N is disclosed.

A process for making an energetic compound is disclosed. The process comprises generating oxygen atoms in the [$^1$D] electronic state and reacting the oxygen atoms with $N_2O$ to form an energetic compound having the structural formula: O—O—N—N.

A second process for making an energetic compound is also disclosed. The process comprises reacting $N_2O$ with a reactive species in which a [$^1$D] oxygen is chemically bound to form an energetic compound having the structural formula: O—O—N—N.

A further aspect of the disclosure includes a method for releasing energy by reacting $H_2$ with a compound having the structural formula: O—O—N—N.

A further aspect of the disclosure includes a solid propellant composition. The solid propellant composition comprises from about 5 weight percent to about 40 weight percent aluminum, from about 5 weight percent to about 70 weight percent of an oxidant having the structural formula: O—O—N—N, and from about 5 weight percent to about 15 weight percent of a binder material.

BEST MODE FOR CARRYING OUT THE INVENTION

The present invention is directed to a high energy compound having the structural formula: O—O—N—N, which we have named asymmetric dinitrogen dioxide (a-$N_2O_2$).

Two vibrationally stable geometries of the compound of the present invention have been predicted by our quantum mechanical calculations. Ab initio calculations on the two geometries where performed using the GAUSSIAN 82/86 system of programs (available from Gaussian, Inc. Pittsburg, Pa.). See W. J. Hehre, L. Radon, P. von R. Schleyer and J. A. Pople *Ab Initio Molecular Orbital Theory* (Wiley-Interscience, N.Y., 1986), the disclosure of which is incorporated herein by reference, for a detailed discussion regarding the theoretical basis for these calculations. Fully optimized $C_s$ structures were found at the Hartree-Fock (HF) and Configuration Interaction, Singles and Doubles (CISD) levels of theory using the 6-31G* basis and at the HF level using the 6-311G* basis. An optimized $C_{2v}$ structure was found by a limited HF study using the 6-31G* basis. A vibrational frequency analysis was performed at each optimized geometry.

Figure 1A:
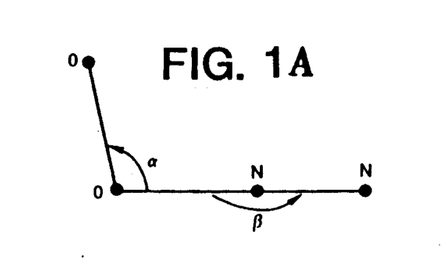
FIGS. 1A and 1B, respectively show $C_s$ and $C_{2v}$ structures for $N_2O_2$.
Figure 1B:
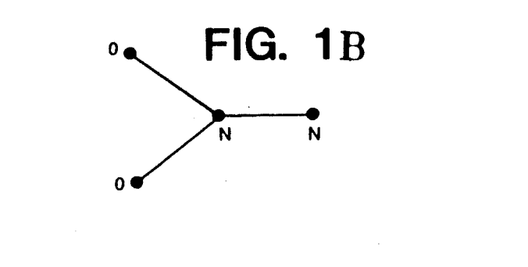

The results of these calculations are shown in FIG. 1 and Table 1.

TABLE I

| $N_2O_2$ theoretical predictions. Bond lengths are in angstroms, bond angles are in degrees, energies are in hartrees, and vibrational frequencies are in wave numbers. | | | | | |
|---|---|---|---|---|---|
| | $C_s$ structure [$^1$A'] | | | $C_{2v}$ structure [$^1$A$_1$] | |
| Level | HF/6-31G* | CISD/6-31G* | HF/6-311G* | | HF/6-31G* |
| Energy | −258.348838 | −258.932499 | −258.417315 | | −258.287006 |
| Geometry | | | | | |
| R(O—O) | 1.7574 | 1.5817 | 1.8014 | R(O—O) | 1.4787 |
| R(O—O) | 1.2024 | 1.2240 | 1.1901 | R(N—O) | 1.3519 |
| R(N—N) | 1.0844 | 1.1072 | 1.0787 | R(N—N) | 1.1268 |
| α | 103.97 | 102.87 | 106.20 | | |
| β | 179.51 | 179.34 | 179.62 | | |
| Vibrational frequencies* | | | | | |
| a' N—N stretch | 2677(8.46) | 2501 | 2656 | a$_1$ N—N stretch | 2203 |
| a' O—N stretch | 1262(4.53) | 1206 | 1282 | a$_1$ symmetric stretch | 1178 |
| a' O—O stretch | 697(0.90) | 648 | 707 | a$_1$ O—N—O scissor | 900 |
| a' O—N—N bend | 291(2.08) | 526 | 271 | b$_2$ O—N—O rock | 670 |
| a' O—O—N bend | 188(0.05) | 227 | 169 | b$_2$ asymmetric stretch | 449 |

TABLE I-continued

N₂O₂ theoretical predictions. Bond lengths are in angstroms, bond angles are in degrees, energies are in hartrees, and vibrational frequencies are in wave numbers.

| $C_2$ structure [$^1$A'] | | | | $C_{2v}$ structure [$^1$A$_1$] | |
|---|---|---|---|---|---|
| a" out-of-plane | 648(0.38) | 580 | 655 | b₁ out-of-plane | 515 |

*hf/6-31G* IR intensities (in $D^2$ amu$^{-1}$ A$^{-2}$) for the $C_s$ structure are given in parentheses following the corresponding frequencies.

The $C_s$ structure shown in FIG. 1(a) is predicted to exhibit both structural and thermodynamic stability. The $C_{2v}$ structure shown in FIG. 1(b) is thermodynamically higher in energy than the $C_s$ structure but is predicted to be unstable toward rearrangement to the $C_s$ structure. Thus, the most significant result of the calculations is the prediction of a stable, asymmetric $C_s$ structure of dinitrogen dioxide with a characteristic IR frequency of 1206±50 cm$^{-1}$, corresponding to the N—O stretch.

Figure 2:
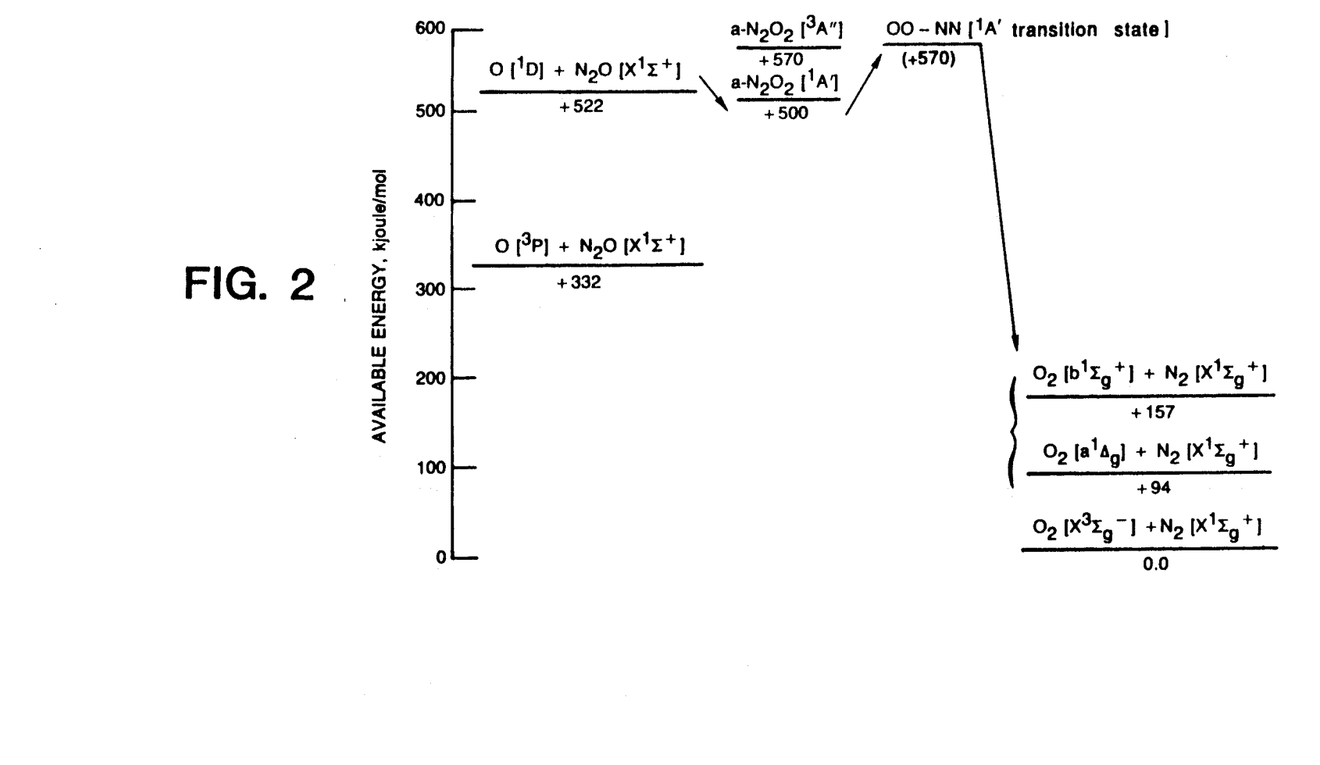
FIG. 2 shows the energetics of the chemical synthesis of a-$N_2O_2$.

The calculated energetics of chemical combinations of oxygen and nitrogen are shown schematically in FIG. 2. FIG. 2 shows that a-N₂O₂ may be formed as an exothermic process from O[$^1$D] and N₂O[X$^1$Σ+]. The a-N₂O₂ is a stable chemical structure with an energy barrier against decomposition into less energetic forms. Barrier for decomposition of this compound to singlet oxygen and nitrogen molecules is predicted to be 70 kjoule/mole. All spectroscopic notation and group symbols used herein follow those recommended in *Molecular Spectra and Molecular Structure Vol. 3*, by Gerhard Herzberg, Van Nostrand Reinhold Co. (New York 1966), the disclosure of which is incorporated herein by reference.

Figure 3:
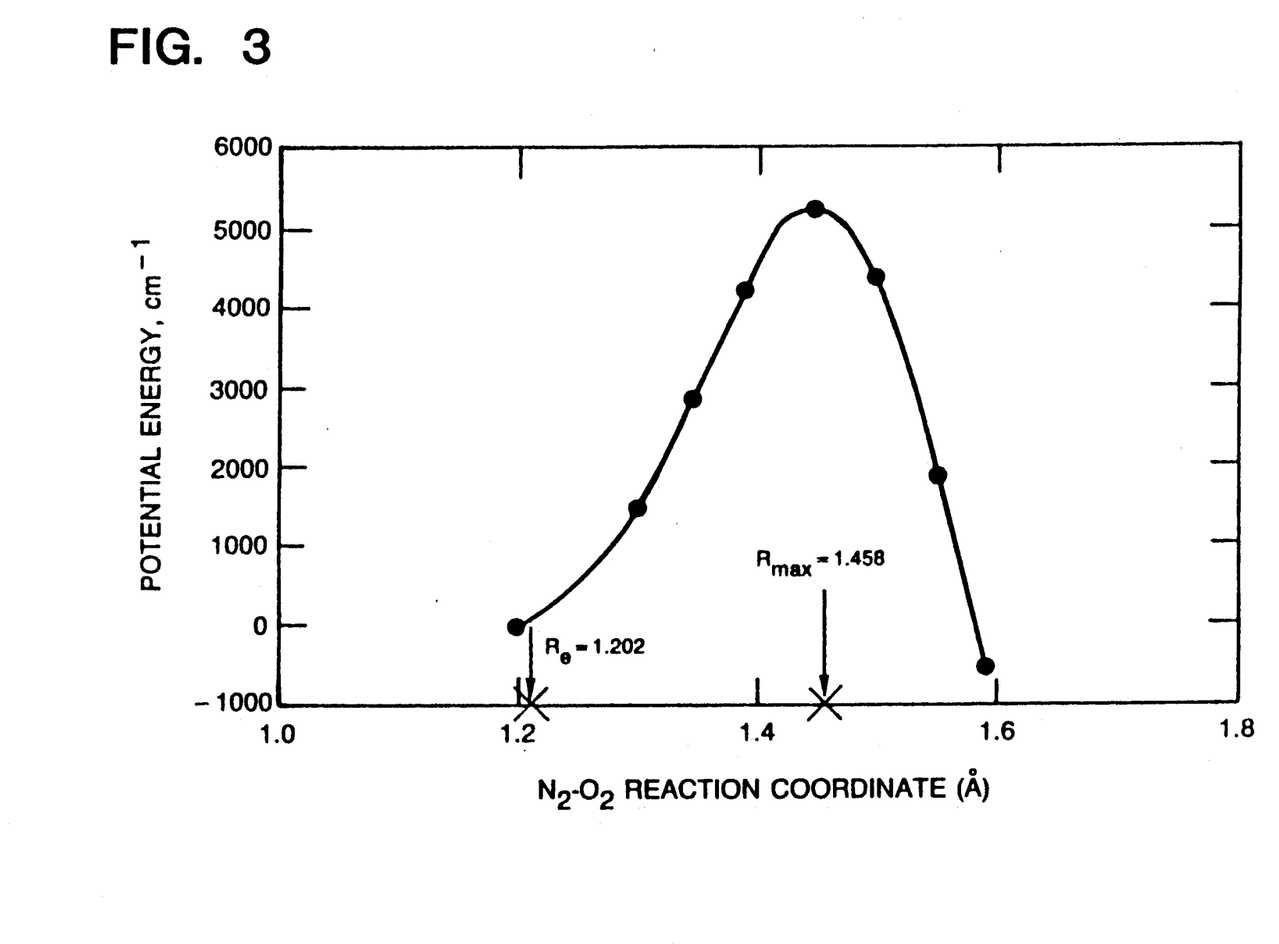
FIG. 3 shows the a-$N_2O_2$ dissociation pathway.

FIG. 3 shows the a-N₂O₂ dissociation pathway as a plot of potential energy verses the N₂—O₂ reaction coordinate. The barrier against decomposition of a-N₂O₂ is large and very broad making it unlikely that the compound of the present invention will decompose or rearrange to a lower energy form by the process of quantum tunneling.

A route for synthesizing the compound of the present invention has been developed using the reaction of oxygen atoms, prepared in their lowest [$^1$D] electronic state, with N₂O. In the following reactions, the molecules N₂O₂, N₂ and O₃ are in the lowest or ground electronic state, 0 atoms are in the first excited [$^1$D] electronic state and the O₂ molecules are in the first excited [a'Δg] electronic state.

Oxygen atoms may be prepared in their lowest [$^1$D] electronic state by photolysis of N₂O:

$$N_2O[X^1\Sigma^+] + h\nu \rightarrow N_2[X^1\Sigma_g^+] + O[^1D],$$

or by the photolysis of O₃:

$$O_3[X^1A'] + h\nu \rightarrow O_2[a^1\Delta g] + O[^1D].$$

The reaction is carried out in the presence of a nonreactive collisional species, e.g. helium, neon, argon or nitrogen, according the reaction:

$$O[^1D] + N_2O[X^1\Sigma^+] + M(E_1) \rightarrow O—O—N—N[^1A'] + M(E_2),$$

where M=non reactive collisional species, and $E_2-E_1$=stabilization energy of O—O—N—N in the lowest [$^1$A'] state. The function of the nonreactive collisional species is to kinetically carry off excess energy and allow the formation of a stable product. The [$^1$D] oxygen atoms are preferably generated and reacted with N₂O in the solid phase at cryogenic temperatures. Liquid phase or gas phase formation of a-N₂O₂ is also possible.

Alternatively, the compound of the present invention may be formed by an exchange reaction of a type:

$$M'O + N_2O[X^1\Sigma^+] \rightarrow O—O—N—N[^1A'] + M',$$

where M'O is any species in which a [$^1$D] oxygen atom is chemically bound. Examples of suitable M'O species include: HClO, HFO, ONF, ONCl and group IIA metal oxides where M'=Mg, Ca, Sn, or Ba.

Finally, the a-N₂O₂ product is condensed to a storable form by forming a-N₂O₂ in situ on a surface held at cryogenic temperatures or by cryogenically cooling the products of the gas phase reaction. The condensed product is collected and stored at reduced, preferably cryogenic, temperatures.

The compound of the present invention may be used as an oxidant in solid propellant formulations. A solid propellant formulation comprises a mixture of a fuel, an oxidizer, a binder and may include other additives such as curing agents and plasticizers.

The solid propellant formulation of the present invention comprises from about 5 weight percent to about 40 weight percent of a conventional powdered metal fuel. Suitable fuels include powdered aluminum, boron or beryllium. Powdered aluminum is the preferred fuel in conventional propellant formulations.

The solid propellant formulation of the present invention comprises from about 5 weight percent to about 15 weight percent of conventional organic polymeric binders. Suitable binder include plastisol binders, such as polyvinyl chloride, oxygen rich double-base binders, such as nitrocellulose, cast binders, such as polybutadiene-acrylic acid, polybutadiene-acrylic acid-acrylonitrile, hydroxy terminated polybutadiene or carboxy-terminated polybutadiene, and rubber-based binders, such as neoprene, styrene-butadiene or butyl rubber.

The solid propellant of the present invention comprises from about 5 weight percent to about 70 weight percent a-N₂O₂.

Preferably, the solid propellant formulation also includes at least one conventional oxidizer in an amount such that total amount of oxidizer, i.e. of a-N₂O₂ and other oxidizers combined, in the propellant formulation is between 5 weight percent and 70 weight percent of the formulation. Suitable conventional oxidizers include perchlorates, such as ammonium perchlorate, potassium perchlorate or sodium perchlorate, nitrates such as ammonium nitrate or potassium nitrate and such crystalline high explosives as cyclotetramethylene tetranitramine (HMX) or cyclotrimethylene trinitramine (RDX).

Figure 4:
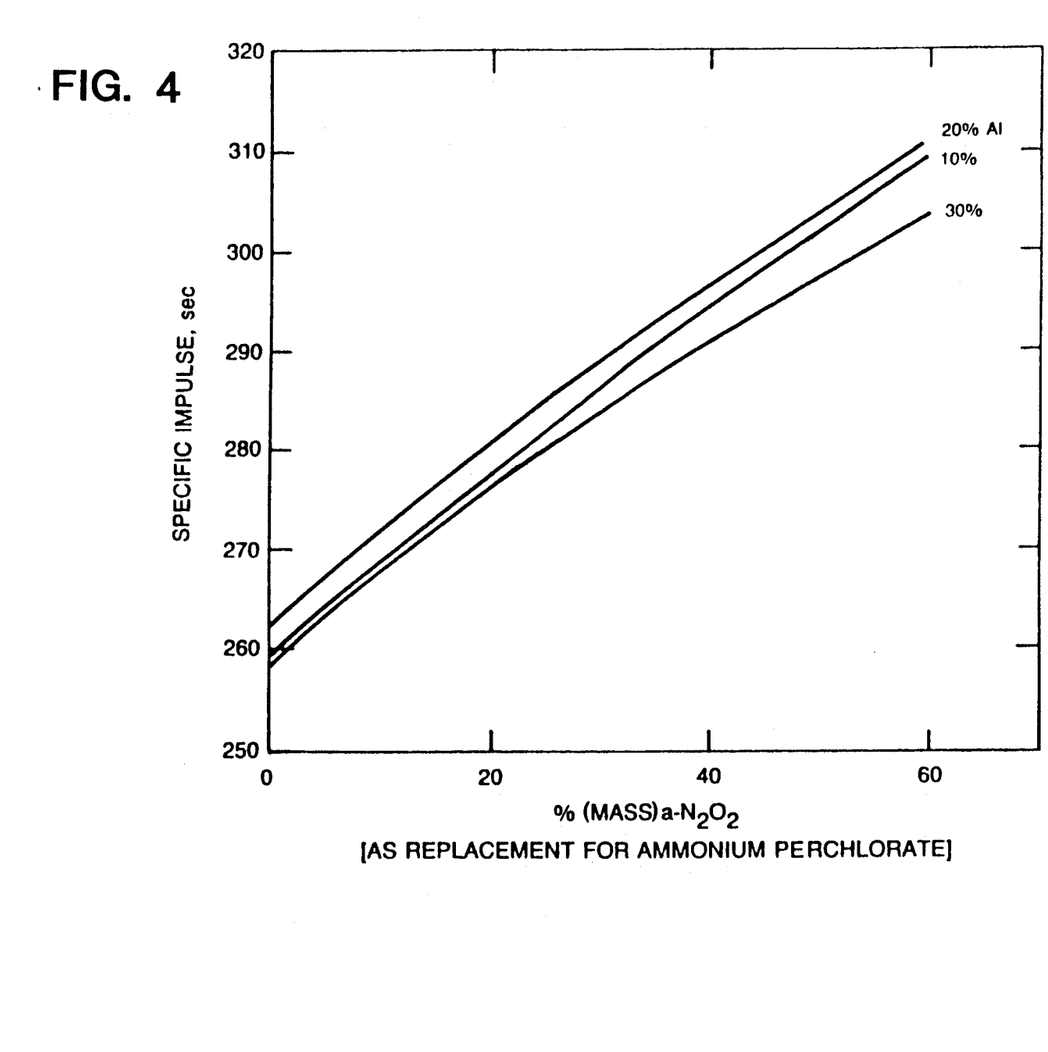
FIG. 4 compares the performance of an aluminum/ammonium perchlorate solid propellant with the predicted performance of an aluminum/a-$N_2O_2$/ammonium perchlorate solid propellant.

The utility of the compound of the present invention is illustrated in FIG. 4 which compares the performance of three aluminum/ammonium perchlorate solid propellants (10, 20 and 30 weight % aluminum) with the predicted performance of solid rocket propellant formulations in which ammonium perchlorate is partially replaced with a-$N_2O_2$. All formulations include 10 weight % of a polymeric binder. Performance is measured in terms of specific impulse, i.e. thrust/unit weight of propellant. Partial substitution of a-$N_2O_2$ for ammonium perchlorate is predicted to result in a dramatic increase in specific impulse.

Figure 5:
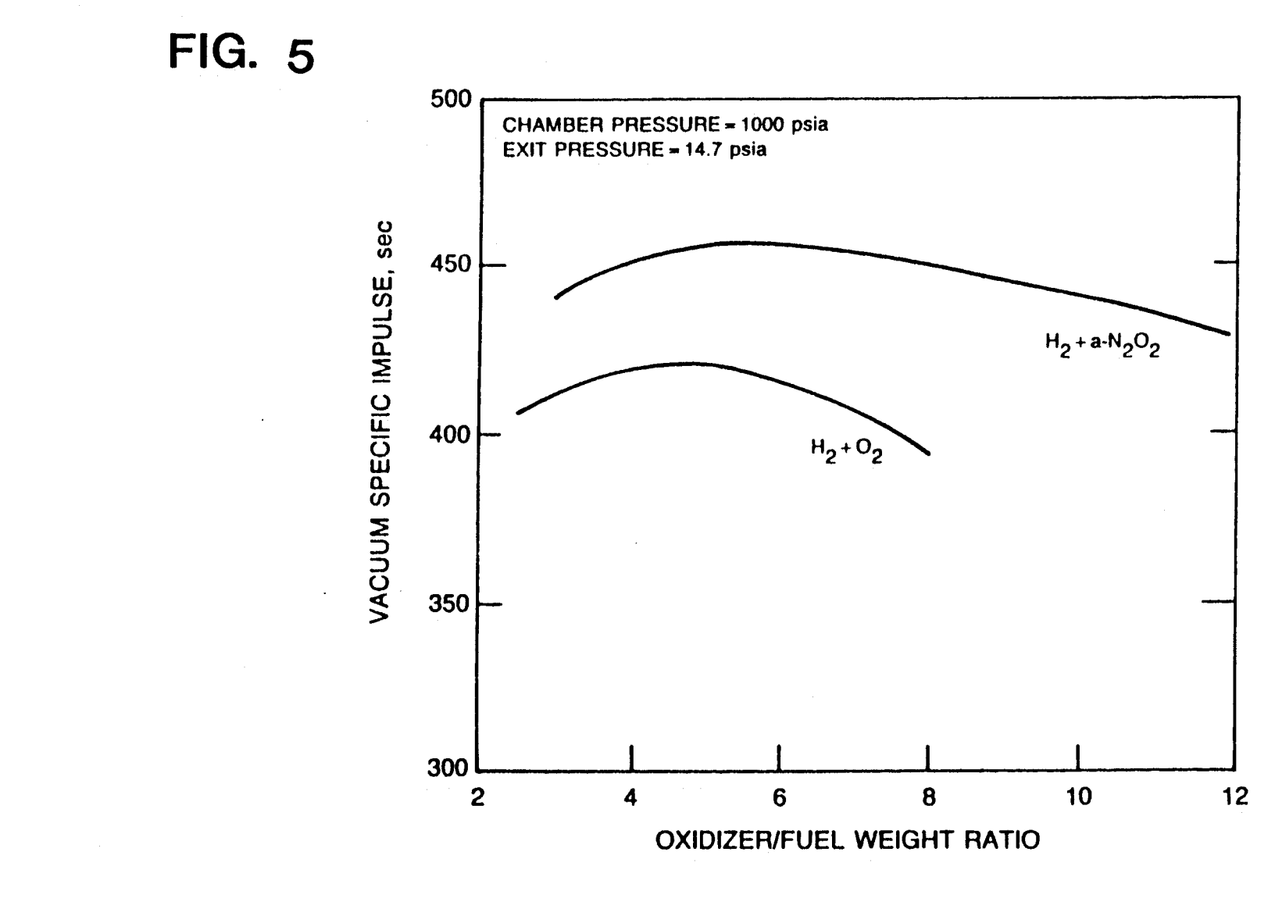
FIG. 5 compares the performance of a $H_2/O_2$ liquid propulsion system with the predicted performance of an $H_2$/a-$N_2O_2$ liquid propulsion system.

The compound of the present invention is also useful as an oxidant in a liquid propulsion system. Specifically, energy may be released by reacting $H_2$ with a-$N_2O_2$. FIG. 5 compares the performance of an $H_2/O_2$ liquid propulsion system with predicted performance of a $H_2$/a-$N_2O_2$ liquid propulsion system. Substitution of a-$N_2O_2$ for $O_2$ is predicted to result in a dramatic increase in specific impulse. The performance analysis was performed with a standard computer program for minimizing the free energy of multicomponent mixtures and for estimating rocket performance (NASA SP-273).

EXAMPLE 1

The proposed solid state synthesis route has been verified experimentally.

Figure 6:
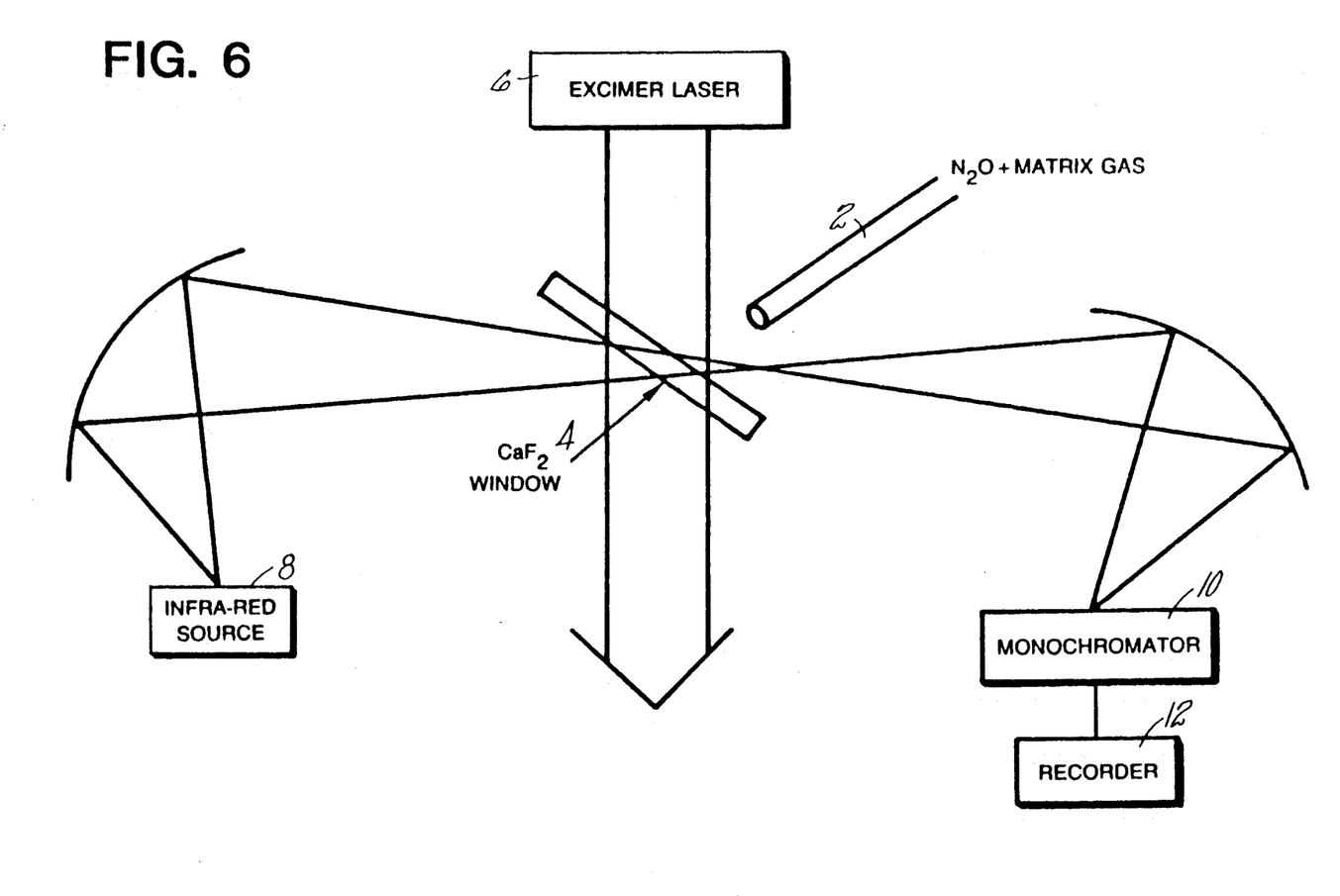
FIG. 6 shows a schematic of an experimental apparatus.

FIG. 6 shows a schematic drawing of the experimental apparatus. The experiment was conducted under vacuum with a flowing gas pressure between $10^{-5}$ torr and $10^{-4}$ torr. Argon was used as the nonreactive collisional species. A gas stream 2 comprising 1 part by volume $N_2O$ and 400 parts by volume argon was directed to a cooled $CaF_2$ window 4. The window 4 was maintained at a temperature between 8° K. and 20° K. The gas stream 2 condensed to form a solid $N_2O$/Ar layer on the surface of the window 4. About 250 cm$^3$ (at STP) of the mixture was condensed on the window 4 during a time period of about 3.5 hours. Oxygen atoms in the [$^1D$] excited state were generated by photolysis of a portion of the condensed $N_2O$. Photolysis was achieved by irradiation of the condensed $N_2O$ with radiation pulses having an intensity of about 100 millijoules at a wavelength of 193 nm using an excimer laser 6. The radiation pulses were of 15 nanosecond duration at a repetition rate of one hertz. A tuneable infrared source 8 was directed through the window 4 to a monochromator 10. Infrared absorption spectra were monitored and recorded by recorder 12.

Figure 7:
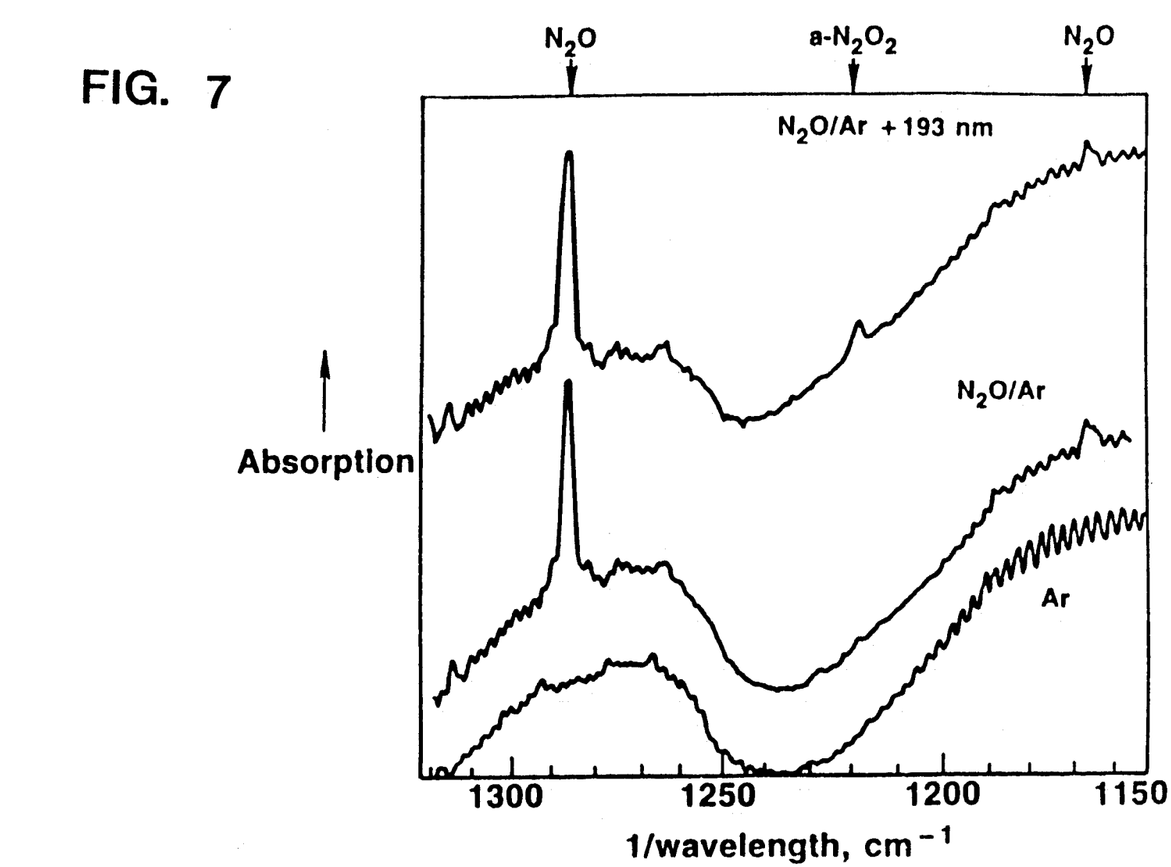
FIG. 7 shows experimentally obtained infrared absorption spectra.

FIG. 7 shows the spectra obtained with argon (Ar), with a mixture of argon and $N_2O$ ($N_2O$/Ar) and after irradiation of a mixture of argon and $N_2O$ ($N_2O$/Ar+193 nm). An absorption peak at a frequency of about 1220cm$^{-1}$, which falls within the region of predicted observation of the NO stretch frequency for a-$N_2O_2$, is present only after irradiation.

The compound of the present invention is a highly energetic compound. Use of the compound of the present invention as an oxidant in chemical propulsion systems may provide dramatically increased performance relative to conventional chemical propulsion systems.

We claim:

1. A compound having the structural formula:

O—O—N—N.

2. A process for making an energetic compound, comprising:
generating oxygen atoms in the [$^1D$] electronic state, and
reacting the oxygen atoms with $N_2O$ to form an energetic compound having the structural formula:

O—O—N—N.

3. The process of claim 2 wherein the energetic compound is condensed to a storable form.

4. The process of claim 3, wherein the energetic compound is condensed at cryogenic temperatures.

5. The process of claim 2, wherein the oxygen atoms are reacted with $N_2O$ in the presence of a nonreactive species.

6. The process of claim 2 wherein the oxygen atoms are generated by the photolysis of $N_2O$.

7. The process of claim 2 wherein the oxygen atoms are generated by the photolysis of $O_3$.

8. The process of claim 2, wherein the oxygen atoms are generated and reacted with $N_2O$ in the solid phase.

9. A process for making an energetic compound, comprising:
reacting $N_2O$ with a reactive species in which a [$^1D$] oxygen is chemically bound to form an energetic compound having the structural formula:

O—O—N—N.

10. The process of claim 9 wherein the reactive species is HClO, HFO, ONF, ONCl, MgO, CaO, SnO or BaO.

11. The process of claim 9 wherein the energetic compound is condensed to a storable form.

12. A method for releasing energy, comprising:
reacting $H_2$ with an oxidant having the structural formula:

O—O—N—N.

13. A propellant composition, comprising:
from about 5 weight percent to about 40 weight percent of a metal fuel, from about 5 weight percent to about 70 weight percent of a first oxidant having the structural formula:

O—O—N—N, and from about 5 weight percent to about 15 weight percent of a binder material.

14. The propellant composition of claim 10, further comprising from about 5 weight percent to about 65 weight percent of a second oxidant, provided that the combined amount of first oxidant and second oxidant does not exceed 70 weight percent.

* * * * *

UNITED STATES PATENT AND TRADEMARK OFFICE
CERTIFICATE OF CORRECTION

PATENT NO. : 5,171,385

DATED : December 15, 1992

INVENTOR(S) : H. Harvey Michels, et al

It is certified that error appears in the above-identified patent and that said Letters Patent is hereby corrected as shown below:

On the title page, in item [57] ABSTRACT, line 1, there should be a --:-- after the word formula.

Signed and Sealed this

Twenty-third Day of November, 1993

Attest:

BRUCE LEHMAN

Attesting Officer     Commissioner of Patents and Trademarks